(12) United States Patent
Carman et al.

(10) Patent No.: US 6,421,428 B1
(45) Date of Patent: Jul. 16, 2002

(54) FLEXIBLE ANI

(75) Inventors: John M. Carman, Alexandria; David H. Cave, Fairfax; Lin H. Kerns, Springfield; Andrew N. Smith, Herndon; Michael G. Pilkerton, Fairfax; R. Andrew Poole, Ashburn, all of VA (US)

(73) Assignee: Bell Atlantic Services Network, Inc., Arlington, VA (US)

( * ) Notice: Subject to any disclaimer, the term of this patent is extended or adjusted under 35 U.S.C. 154(b) by 0 days.

(21) Appl. No.: 09/263,772

(22) Filed: Mar. 5, 1999

(51) Int. Cl.[7] .............................................. H04M 1/64
(52) U.S. Cl. .................. 379/88.2; 379/115.01; 379/127.01; 379/144.02; 379/207.15; 379/229
(58) Field of Search ........................... 379/88.2, 88.21, 379/88.19, 115.01, 118, 120, 123, 127.01, 132, 144.02, 207.15, 229, 220.01

(56) References Cited

U.S. PATENT DOCUMENTS 5,018,191 A * 5/1991 Latron et al. .......... 379/100.09
5,586,177 A   12/1996 Farris et al.
5,867,562 A *  2/1999 Scherer ................. 379/112 X
6,154,532 A * 11/2000 Lockhart et al. ........ 379/112 X

OTHER PUBLICATIONS

BOC Notes on the LEC Networks–1994, Signaling, SR–TSV–002275, Issue 2, Apr. 1994, pp. 6–146—6–160.

* cited by examiner

Primary Examiner—Creighton Smith

(57) ABSTRACT

In various forms of telephone network signaling, automatic number identification information (ANI) includes a field of two or more 'information' (II) digits, typically used to indicate a calling line attribute, such as hospital line, residential line, payphone, etc. A number of situations have arisen where it is desirable to use these digits to control network functions and it is necessary to accurately pass the digits through with all call related signaling. For example, accurate II digits can enable appropriate processing, billing and payments for toll-free calls from payphones. Existing switch software, however, does not always provide the correct II digits or pass the digits through unchanged. In accord with the invention, a call requiring flexible ANI functionality triggers access to a central database, preferably in a service control point (SCP) or a signaling transfer point (STP). The response message from the database provides the appropriate information digits for the ANI field, and the network switches pass the signaling with those digits for all further processing of the call.

27 Claims, 10 Drawing Sheets

FLEXIBLE ANI

TECHNICAL FIELD

The present invention relates to telecommunications services offered through a telephone network, and more particularly to translating identification information digits associated with a telephone call.

ACRONYMS

The written description uses a large number of acronyms to refer to various services, messages and system components. Although generally known, use of several of these acronyms is not strictly standardized in the art. For purposes of this discussion, acronyms therefore will be defined as follows:
Advanced Intelligent Network (AIN)
Automatic Intercept System (AIS)
Automatic Number Identification (ANI)
Call Processing Record (CPR)
Central Office (CO)
Common Channel Interoffice Signaling (CCIS)
Customer Owned Coin Operated Telephone (COCOT)
Data and Reporting System (DRS)
Industry Carriers Compatibility Forum (ICCF)
Integrated Service Control Point (ISCP)
Line Identification Data Base (LIDB)
Local Exchange Carrier (LEC)
Plain Old Telephone Service (POTS)
Point in Call (PIC)
Public Switched Telephone Network (PSTN)
Service Control Point (SCP)
Service Creation Environment (SCE)
Service Management System (SMS)
Service Switching Point (SSP)
Signaling System 7 (SS7)
Signaling Transfer Point (STP)
Stored Program Control (SPC)
Telephone Company (Telco)
Transaction Capabilities Applications Part (TCAP)
Transmission Control Protocol/Internet Protocol (TCP/IP)

BACKGROUND ART

The public switched telephone network (PSTN) utilizes automatic number identification (ANI) information to provide various calling features and services. ANI information conveys the calling party and the called party's numbers. In one application of ANI, for example, ANI information associated with a target station is entered into an ANI trigger table in an intelligent switch, and the service profile is loaded into a database. When a call originates from the target station, information in the database is applied to the switch to provide the desired characteristics during further call processing.

In addition, this information assists in signaling for call setup and tear down. Within the signaling path of a call, the switch provides two information digits, which are a part of the ANI information, to indicate the type of originating station or call (e.g., payphone, POTS, toll-free call, etc.). These two digits are commonly referred to as information (or "II") digits. The switch places the II digits before other information digits in the signaling message.

Through industry consensus, the Industry Carriers Compatibility Forum (ICCF) standardizes these ANI information digits. For example, "00" has been designated to indicate that the source of the call is from a Plain Old Telephone Service (POTS) line. A "24" signifies that the calling party has initiated a toll-free call. Also, a "27" means the call is from a coin-operated station (i.e., payphone). An exhaustive list of II digits may be found in the Local Exchange Routing Guide (Bellcore document no. TR-EOP-000085), dated March 1994.

Although the existing II digits may signify that the call is toll-free or originates from a payphone (i.e., a single line attribute), it does not provide a capability to convey both types of information at once. In other words, a toll-free call originating from a payphone does not have designated II digits that correspond to this situation. As a result, details regarding the call are lacking. This deficiency is made apparent by the call flow of FIG. 1.

In FIG. 1, an originating station (step 101) initiates a call. A local central office (CO) then collects the dialed digits from the originating station, step 102. The CO determines (103) the origin of the call by querying a customer profile for the line attribute associated with the terminal line of the originating station. If it is found that the call is from a COCOT (i.e., payphone) (104), the II digits are set to "27" (105) to indicate that the call originated from a payphone. However, if the origin of the call is not from a payphone, the II digits are set accordingly (e.g., "00" for POTS station) per step 106. The ANI software module within the switch performs the setting of the II digits based upon the retrieved line attribute information. The CO next examines the collected digits to determine whether the call is a toll-free call (107). If the call is toll-free, then the II digits are set to "24", corresponding to an 800 type call (step 108). As illustrated in step 109, the call is routed to the terminating central office, via an interexchange carrier (IXC) network. Once the terminating CO receives the call establishment request, it completes the call setup by ringing the destination station (step 110).

With the current telephone system, a payphone originated call would cause the serving CO switch to assign II digits of "27," indicating within the ANI information field that a call is coming from a coin-operated terminal. A problem arises when the payphone initiates a toll-free call, which has a code of "24". In this case, the toll-free-service software module within the serving switch overrides the ANI software module to employ II digits associated with the toll-free call, 24. In the case of toll-free calls, the II digits are hard coded, preventing any software attempts to change them. Consequently, the II digits of "27", which indicated that a coin-operated phone initiated the call, is superseded by a "24".

A major drawback of this approach is its impact on accounting and billing of the call. Because information concerning the origin of the call is lost, any accounting information attributed to the coin-operated station can not be tracked. As a practical matter, the proprietor of the customer-owned coin-operated telephone(COCOT) can not accurately recoup his share of the fees from the toll-free service subscriber because the call can no longer be traced to the coin-operated telephone. The information loss can also be caused by the inability of any tandem switches to pass the converted II digits.

In general, because the II digits are determined on an industry-wide basis, they can not be readily modified for internal network use. A local exchange carrier (LEC), for instance, is precluded from altering these II digits for its proprietary use. Currently, modification of these II digits requires significant investment in software development to create costly software patches for each and every switch in the carrier's network. Furthermore, these software patches adversely impact hardware sizing of the switches (e.g., memory requirements), entailing additional expenses. Switch vendors have been aware of this dilemma.

In the past, vendors have marketed "flexible" ANI software to enable alteration of II digits. These software suffer from the drawback that the II digits are still overwritten by hard coding. As a result, significant flexibility of manipulating the II digits is sacrificed.

Also, with today's telecommunication services, a network provider, such as an IXC, has no viable mechanism to screen or block calls based on the call type and/or call origin. Blocking of calls may be desirable if the cost of transporting and managing the call is economically impractical. For example, an IXC may not wish to transport toll-free calls that originate from COCOTS simply because it would require maintaining a separate account for COCOT originated toll-free calls. This imposes a tremendous administrative burden on the IXCs. Separate accounting is needed because the. COCOT owner is owed a share of the revenue generated by the calls. Therefore, a network provider may choose not to carry such calls.

DISCLOSURE OF THE INVENTION

There is a need for an effective and flexible way to translate the II digits for proprietary or internal use. In particular, a need exists to assign multiple line attributes on a per terminal line basis to preserve the type of call as well as type of originating station, whereby the new II digits are maintained through out the signaling path of the call. There is also a need to provide a blocking service to network providers (e.g., interexchange carriers), which may elect to terminate a call based on the origin and type of call.

The present invention meets the above noted needs by employing a flexible ANI database, which translates the conventional two II digits to a new set of ANI digits. This new set of ANI digits may be made up of any number of digits (e.g., from two or three digits to as much as 4,000 digits). The new ANI digits permanently supercede the two II digits and are relayed through the telephone network and any intervening nodes and networks for the call establishment. Further, the flexible ANI database is adaptable to an advanced intelligent network (AIN) in addition to the traditional PSTN.

One aspect of the present invention provides a method for providing telecommunication services over a telephone network. The method comprises receiving a request to establish a telephone call from a station via a terminal line. Then, line attribute information associated with the terminal line is retrieved. The method also includes generating a first identification message based on the retrieved line attribute information. The first identification message is translated into a second identification message. Lastly, the method involves establishing the call connection based on the second identification message.

Another aspect of the present invention provides a method for providing telecommunication services over a telephone network. The method comprises receiving a request to establish a telephone call from a station over a terminal line and retrieving line attribute information associated with the terminal line from a customer profile. Next a first automatic number identification information digit is generated based on the line attribute information. The method further includes translating the first set of automatic number identification information digits into a second set of automatic number identification information digits that indicate multiple line attributes related to the terminal line. The second set of automatic number identification information digits is relayed to a terminating end office. Call connection is then established based upon the second set of automatic number identification digits.

Still another aspect of the present invention provides a communication system for providing telecommunication services and associated accounting functions comprising a station that is used for establishing a telephone call over a terminal line. A plurality of separately located central office switching systems are interconnected via trunk circuits for selectively providing switched telephone call communications to the terminal line. A customer profile is coupled to one of the plurality of central office switching systems. The customer profile comprises line attribute information associated with the terminal line. One of the central office switching systems is configured to generate a first line identification number based upon the line attribute information. Furthermore, a line identification database stores a second line identification number and is accessible by any one of the plurality of central office switching systems. One central office switching system translates the first line identification number into the second line identification number via queries to the line identification database. The second line identification number is then relayed to another central office switching system. The second line identification number is used to support the accounting functions related to the telephone call.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

BEST MODE FOR CARRYING OUT THE INVENTION

The present invention provides a mechanism to readily alter the ANI information digits to enhance call processing and billing functions of the telephone network. This mechanism revolves around the use of a flexible ANI database, which may reside at any node within the public switched telephone network (PSTN). In a non-AIN environment, the flexible ANI database would most likely reside within the serving central office (i.e., end office). In an AIN implementation, the flexible ANI database may be co-located with the STP or the SCP. Once the new ANI digits are retrieved from the flexible ANI database, they are utilized for all further processing of the call.

Figure 1:
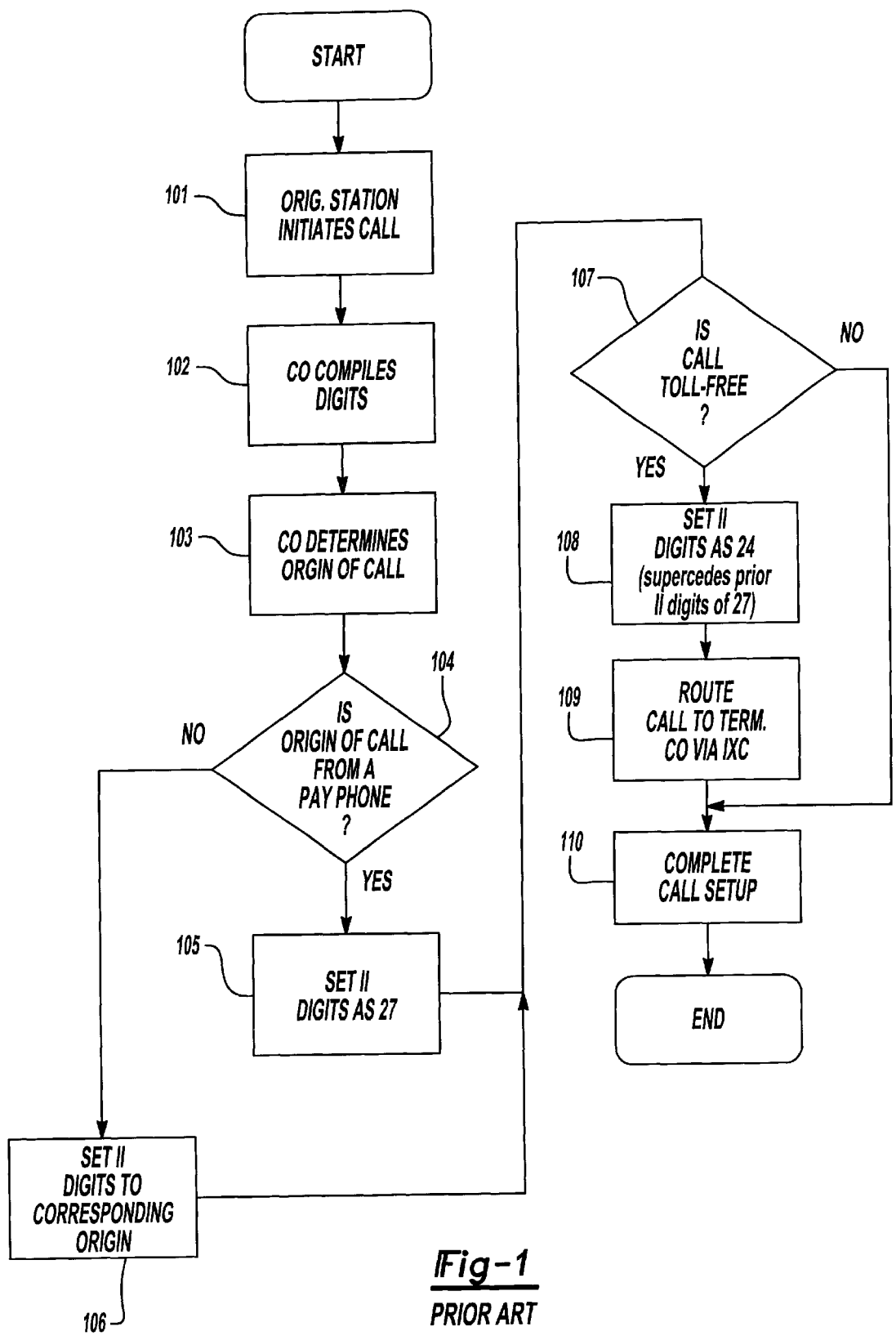
FIG. 1 is a call flow diagram of a conventional treatment of the II digits.
Figure 2A:
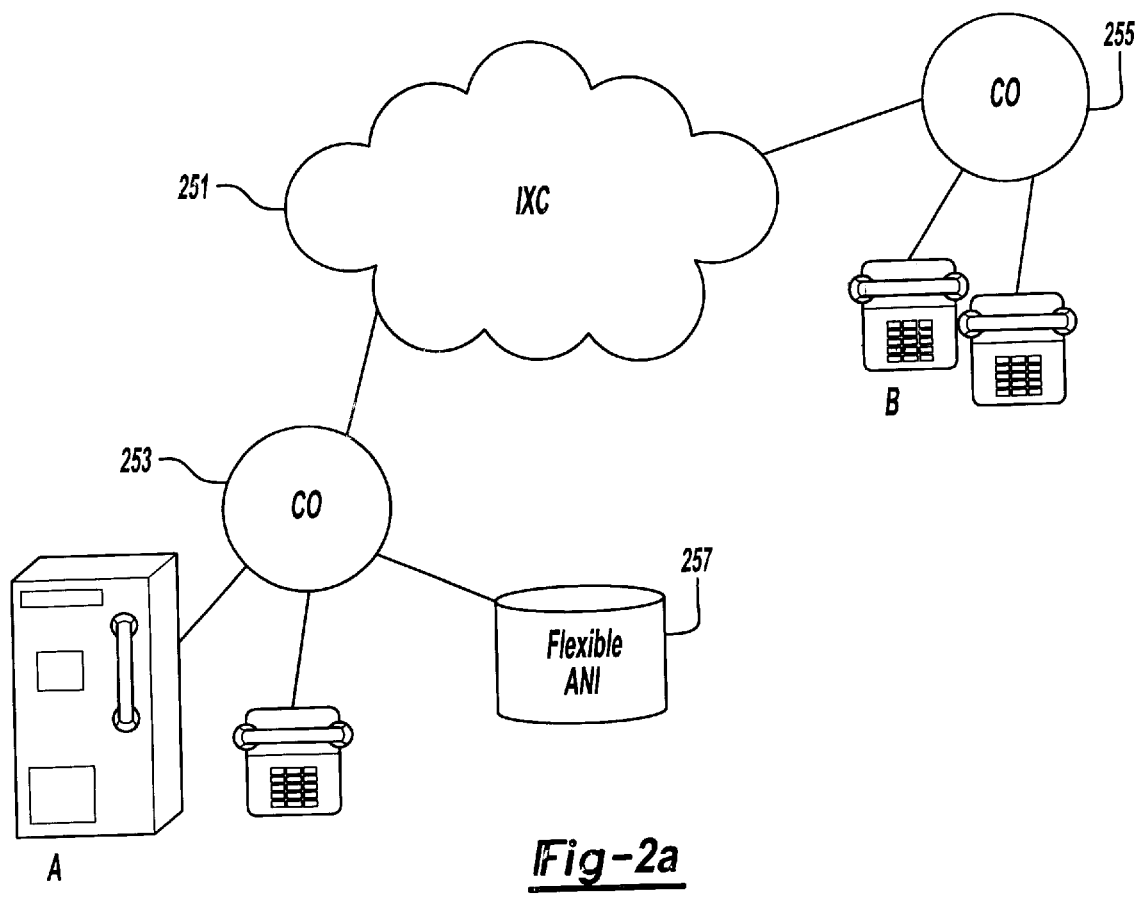
FIGS. 2a and 2b illustrate a block diagram and associated call flow in which a PSTN interfaces with an IXC in accord with one embodiment of the present invention.

FIG. 2a shows a simplified network involving two central offices linked by an IXC network, in accord with one embodiment of the present invention. This network configuration with the flexible ANI database enables greater flexibility in the use of II digits for providing and performing various network services. The network, as shown, can be a conventional PSTN or an enhanced version thereof known as AIN. Station A signals to CO 253 for establishment of a toll-free call. If Station A is a COCOT, the switch within CO 253 queries the flexible ANI database 257 to obtain a new set of II digits. These new II digits preserve information that conveys the type of originating station; in addition, they convey the fact that the call is a toll-free one. The new II digits are forwarded via in-band signaling (e.g., feature group D) to the IXC 251 for transport to the terminating CO 255. The terminating CO 255 in turn notifies the target station B about the call establishment request. The call flow associated with this network configuration is described below.

Figure 2B:
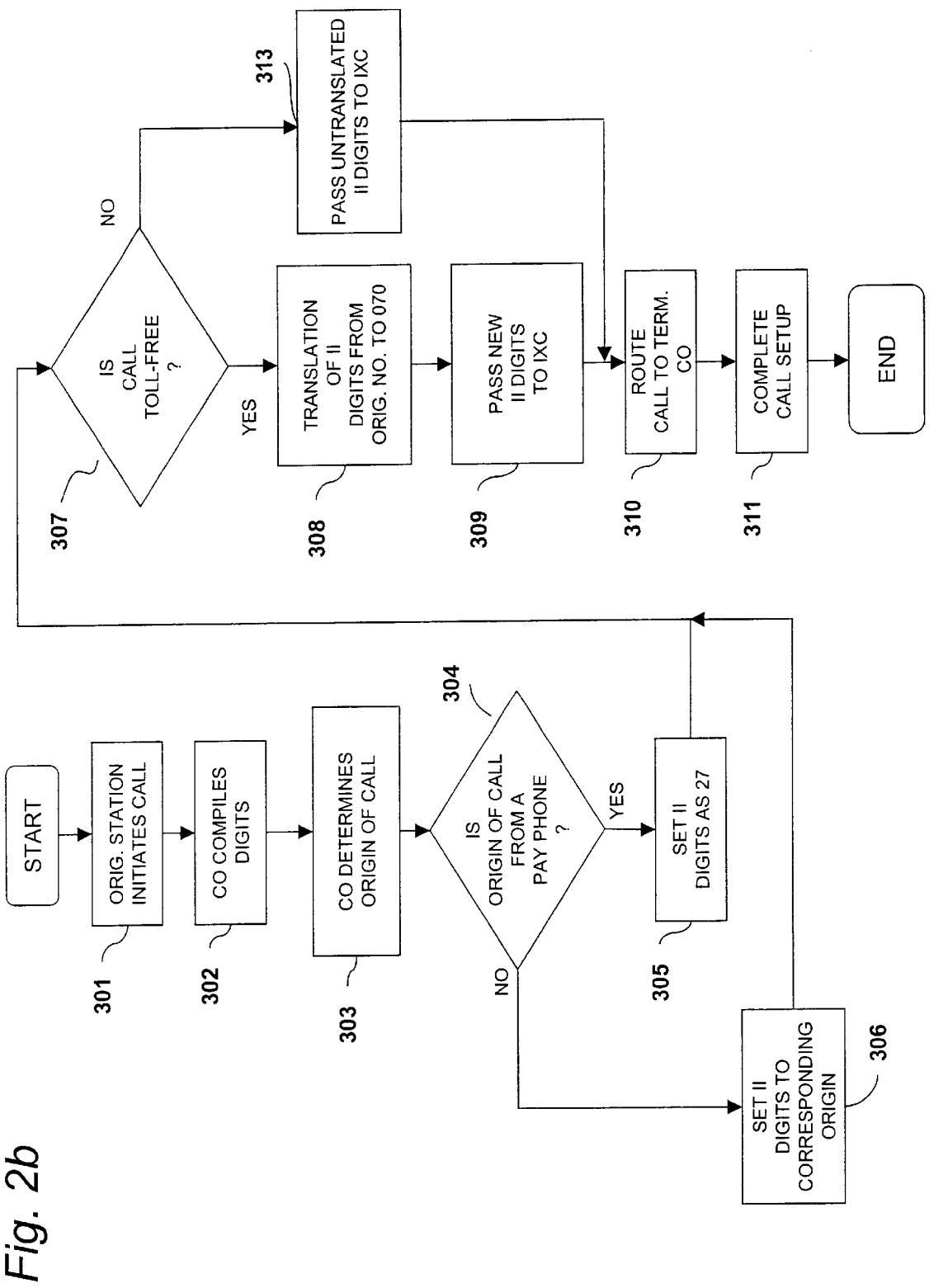

As shown in FIG. 2b, a call is initiated by originating station A of FIG. 2a (step 301). Central office (CO) 253 then collects the dialed digits from the originating station A, step 302. The CO 253 determines (303) the origin of the call by querying a customer profile resident on the switch (not shown) for the line attribute associated with the terminal line of the originating station A. If the call is from a COCOT (i.e., payphone) (304), the II digits would be set to "27" (305) to indicate that the call originated from a payphone. If the call is from anywhere other than a payphone, the II is set accordingly (e.g., "00" for POTS terminal) per step 306.

The CO 253 next examines the collected digits to determine whether the call is toll-free (307). If the call is toll-free, then the switch queries the flexible ANI database 257 to assign new II digits; e.g., the new II digits may be three digits, "070." These new digits may be assigned in any fashion desired; it is at the discretion of the local exchange carrier (LEC) in cooperation with other network providers to develop a coding scheme to suit their needs. These II digits should correspond to an 800 type call originating from a COCOT. The new II digits are then passed by CO 253 to the IXC 251 using in-banding signaling, as illustrated in step 309, and then routed to the terminating CO 255 (step 310). Once the terminating CO 255 receives the call establishment request, it completes the call setup by ringing the destination station B (step 311). Because the new II digits indicate to the IXC 251 that a toll-free call originates from a COCOT, the IXC 251 has the option of not processing the call if it chooses not to do so. The LEC can properly monitor and gather the call details of the toll-free call. Thus, the LEC can keep accurate accounting of which parties are entitled to collect fees associated with the toll-free call once the IXC customer account is billed. If, however, the call is not toll-free (307), the untranslated (i.e., original) II digits are passed to the IXC, as in step 313. Thereafter, the call is simply routed to the terminating CO (310), which then completes the call setup (311).

The above method can be accomplished, in the preferred embodiment, in an advanced intelligent network (AIN) implementation. To understand the present invention, it may be helpful first to consider the architecture and operation of an AIN type implementation of a public switched telephone network.

Figure 3A:
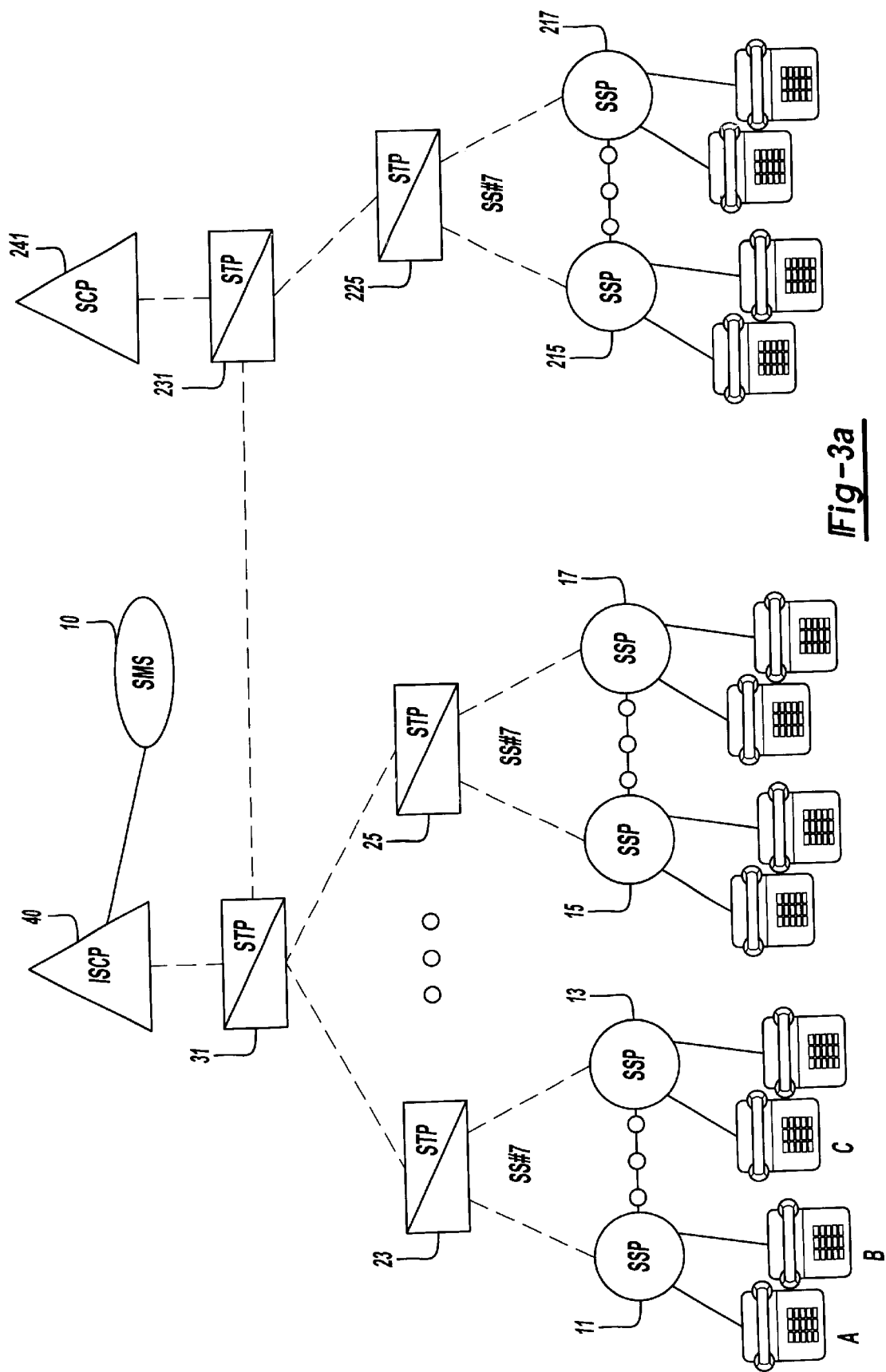
FIGS. 3a, 3b and 3c show diagrams of exemplary AIN architectures and associated common channel signaling network suitable for carrying out an embodiment of the present invention.

The concept of the Advanced Intelligent Network (AIN), as shown in FIG. 3a, has been to provide services based on feature logic and data located at a centralized node in the network rather than in each individual switching system node. As shown, the telephone network includes a switched traffic network and a common channel signaling network carrying the control signaling messages for the switched telephone traffic network. The system may further include a secondary signaling network and/or a packet data transport network (not shown). The telephone or traffic network (operated by a combination of local carriers and interexchange carriers) includes a number of end office and tandem office type central office switching systems. The central office switching systems are Service Switching Point (SSP) capable, as will be described later in further detail. Trunk circuits (not all shown) carry communication traffic between the central office switches (i.e., SSPs). Appropriately equipped SSP switches in the network communicate with a centralized node, known as a Service Control Point (SCP) database, and together, they provide various AIN services.

As shown in FIG. 3a, the Central Offices (CO) are labeled as SSP 11, 13, 15, 17, 215 and 217. The SSPs 11 and 13 connect to a first local area Signal Transfer Point (STP) 23, and the SSPs 15 and 17 connect to a second local STP 25. The connections to the STPs are for signaling purposes; signaling is accomplished using common channel signaling (e.g., Signaling System 7). The dashed lines indicate data links, while the bolded lines between the SSPs (e.g., 11 and 13) denote trunk circuits. The Service Management System (SMS) 10 is an operations system used to administer data in the SCP 40 and to provide other operations, administration and maintenance functions for the AIN.

The SSP (e.g., 11) knows which calls require AIN service based on characteristics of the call, such as the digits that were dialed or the line from which it originated as indicated by the II digits. The process of identifying calls that require AIN processing is known as triggering (i.e., AIN trigger), since a particular characteristic of the call triggers the switch into providing AIN treatment. As just one example, the switch may use a 3-/6-/10 digit trigger set to detect dialing of certain digits as an indication when AIN processing is required. Once a trigger occurs, a query message is sent to the SCP (40 or 241) asking for instructions. The SSP sends the II digits within the query message; for instance, the SSP may assemble a TCAP message to include ANI information. By examining the TCAP message with the encapsulated II digits, the SCP (40 or 241) may determine the proper treatment of the call and instruct the SSP accordingly. In other words, based on information contained in the query message, the SCP (40 or 241) determines which service is being requested and provides appropriate information such as routing and billing instructions. The SSP (e.g., 11) then executes these routing instructions to complete the call.

Only the SCP (40 or 241) knows which service is being performed on a particular call. The SSP simply knows how to identify calls that require AIN processing, and how to execute instructions provided by the SCP (40 or 241). This architecture provides the first stage of realizing AIN capabilities and is predicated on providing SSP capabilities for SPC switches such as the 5ESS® (by Lucent Technologies®); but other vendors, such as Nortel® and Seimens®, manufacture comparable digital switches which could serve as the SSPs.

At least some, and preferably all, of the central office switches (COs), are programmed with SSP capability to recognize identified events or points in call (PICs) as advanced intelligent network (AIN) type service triggers. The SSPs 11 and 13 connect to a first local area STP 23, and the SSPs 15 and 17 connect to a second local area STP 25.

As indicated by the small circles below STPs 23 and 25, each local area STP can connect to a large number of the SSPs. In FIG. 3a the central offices or SSPs are interconnected to each other by trunk circuits (shown as bolded lines) for carrying telephone services.

The local area STPs 23 and 25 and any number of such local area STPs shown as black dots between STPs 23 and 25 communicate with a state or regional STP 31. The state or regional STP 31 in turn provides a communications link with the SCP 40. STP 231 is also a regional node that ties SCP 241 into the AIN network. Local STP 225 connects to STP 231, providing a possible route for SSPs 215 and 217 to access SCP 241. The STP hierarchy can be expanded or contracted to as many levels as needed to serve any size area and to service any number of stations and central office switches. The links between the SSPs and local area STPs are dedicated CCIS links which are typically SS7 type interoffice data communications channels. The local area STPs are in turn connected to each other and to the regional STP 31 via SS7 channels. The regional STP 31 also communicates with SCP 40 via one or more SS7 links.

The SCP 40 may be implemented in a variety of ways. The SCP 40 may be a general purpose computer running a database application and may be associated with one of the switches. Another alternative is to implement a database of CPRs or the like within an STP (see e.g. Farris et al. U.S. Pat. No. 5,586,177).

Figure 3B:
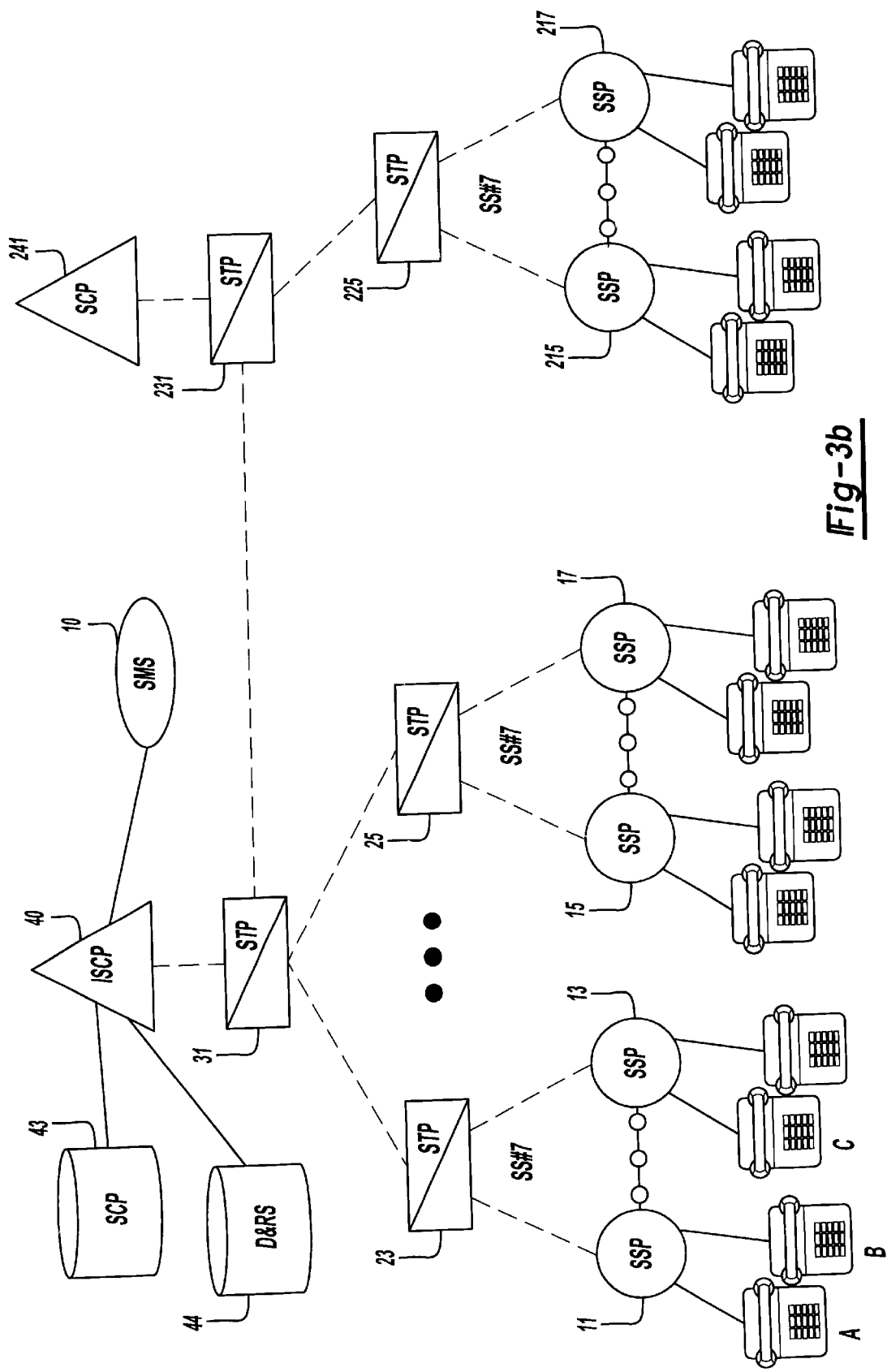

The SCP 40 may be augmented in functionality to an integrated SCP (ISCP) as shown in FIG. 3b. Among other system components, the ISCP includes a Data and Reporting System (DRS) 44, SMS 10, and a SCP database 43. The ISCP also typically includes a terminal sub-system referred to as a Service Creation Environment (SCE) (not shown) for programming the database for the services subscribed to by each individual business customer. As previously mentioned, the ISCP 40 may be a general purpose computer storing a database of call processing information. Additionally, the ISCP 40 may be the actual Integrated Service Control Point (ISCP) developed by Bell Atlantic® and Bellcore®. The components of the ISCP 40, SMS 10, DRS 44, and SCE, are connected by an internal, high-speed data network, such as a token ring network. The internal data network also typically connects to a number of interfaces for communication with external data systems, e.g., for provisioning and maintenance. In the preferred embodiment, one of these interfaces provides communications to and from the ISCP via a packet switched data network, such as a private TCP/IP network operated by the carrier.

With the ISCP 40, enhanced AIN services are available. In particular, toll-free call processing is streamlined with the ISCP 800 service software. The ISCP 800 service software permits a more efficient and fault-tolerant way to handle a large volume of 800 type (toll-free) calls. This capability reduces call processing delays. Other aspects of the ISCP 800 service include sophisticated network management to prevent the ISCP 40 as well as the telephone network from becoming overloaded with calls. Another function of the ISCP software provides the LECs a convenient method to bill for 800 type number database translation services.

Each central office switching system of FIG. 3b normally responds to a service request on a local communication line connected thereto to selectively connect the requesting line to another selected local communication line. The connection can be made locally through only the connected central office switching system. For example, for a call from station A to station B the SSP 11 provides the call connection without any connection to another central office. When the called line connects to a distant station, (for example, when station A calls station C), the connection is made through the connected central office switching system SSP 11 and at least one other central office switching system SSP 13 through the telephone trunks interconnection of the two SSPs 11, 13.

As is understood by those skilled in the art, common channel signaling separates the signaling path from the path used for voice transmission. The Common Channel Signaling Network (CCSN) provides signaling instructions needed by the voice network to set up, route and terminate calls. The II digits are transported via this CCSN in an AIN environment. Specialized databases connected to the CCSN permit the signaling network to transport the specialized routing or terminating instructions which the databases contain.

The basic operation of the CCSN network is as follows. Based on some characteristic of the call (e.g., the line from which the call originated, or the access code that was dialed), the SSP determines that the call requires AIN processing. This process is known as triggering, and it results in the SSP suspending call processing, sending a query message to the SCP and waiting for instructions. For example, when a COCOT initiates a toll-free call, it triggers AIN processing so that a corresponding query message is formed in the serving CO. The query message is then sent to the SCP via a Signaling Transfer Point (STP).

Based on information in the query message, and on the current status of the network, the STP determines which SCP should process the query, and it forwards the query message to that SCP. When the SCP receives the query message it first determines which service is being requested since an SCP typically contains logic and data for many different services and customers. Once this is done, the SCP begins processing the service logic.

The SCP service logic, which is typically constructed directly by the telephone company (Telco), uses various criteria to determine how to handle the call. Examples of these criteria are the calling number, the dialed number, the day of week, and the time of day. Once the SCP has determined how to process the call, it sends a message containing instructions back to the SSP. In the simplest case, these instructions would be sufficient to route the call, and the SCPs function for that call would be complete. However, for more complex services, several messages might be sent back and forth between the SCP and the SSP until the SCP has sufficient information to provide final instructions for the call.

In the telephone network of FIG. 3a, only the SSP can communicate with the SCP. Thus, conventional POTS central offices must route AIN calls to the SSP where full AIN processing can occur. The messages transmitted between the SSPs and the SCP are all formatted in accord with the Transaction Capabilities Applications Part (TCAP) of the SS7 protocol. TCAP provides standardized formats for various query and response messages. ANI information (i.e., II digits) may be transported using TCAP. Each query and response includes data fields for a variety of different pieces of information relating to the current call. For example, an initial TCAP query from the SSP includes, among other data, a code identifying the type of event which triggered the query. The key event in this case is the toll-free call. TCAP also specifies a standard message response format including routing information, such as primary carrier ID, alternate carrier ID and second alternate carrier ID and a routing number and a destination number. Call setup over the AIN will be discussed later.

Figure 3C:
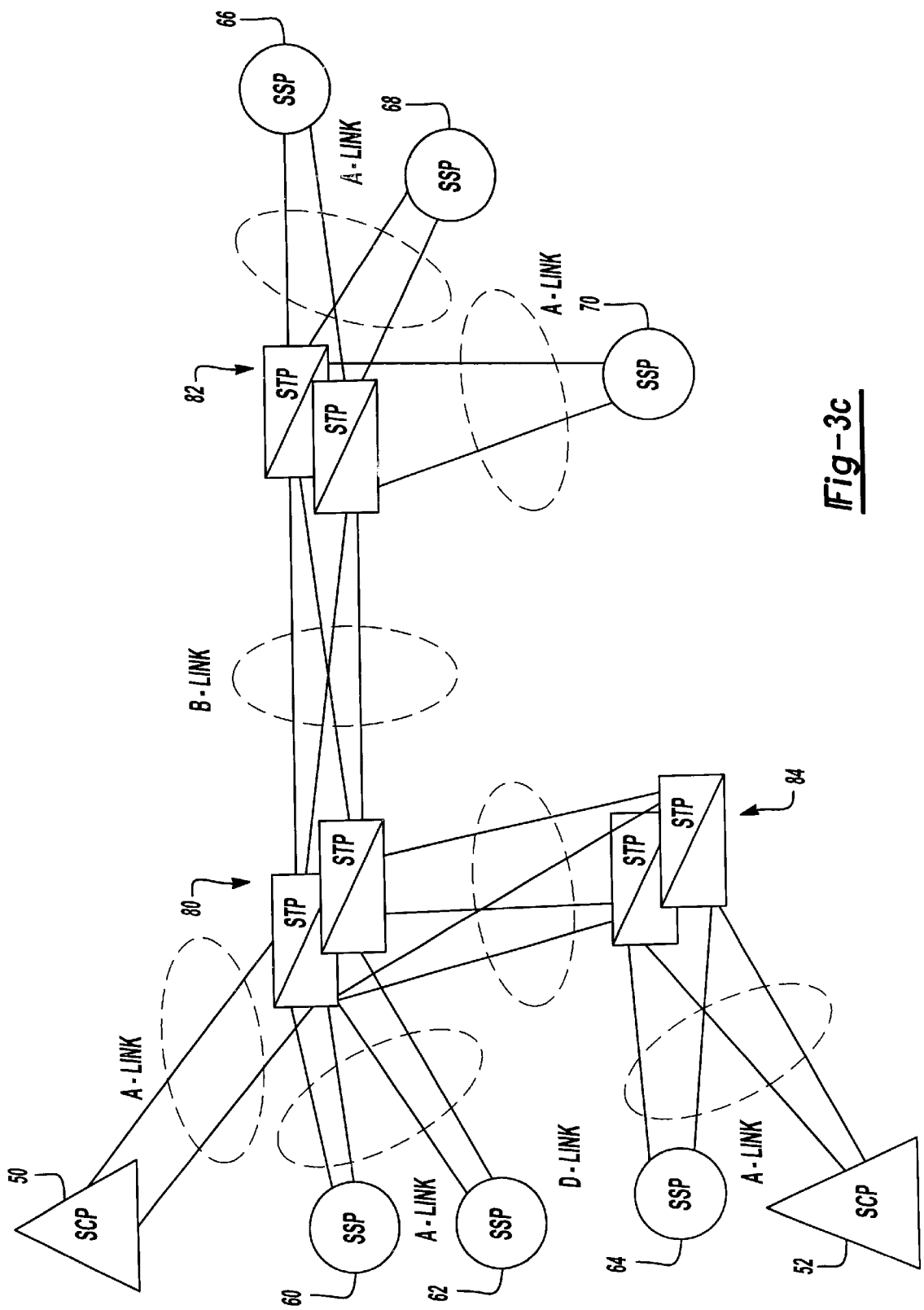

A typical CCSN network is illustrated in FIG. 3c. The preferred telephone network includes a common channel interoffice signaling (CCIS) network carrying a variety of signaling messages. These signaling messages principally relate to control of call processing through the traffic portion of the network. The II digits are transmitted from an originating SSP to a terminating SSP via this out-of-band signaling network (e.g., SS7 TCAP messages). The CCIS network includes packet data links (shown as dotted oval lines) connected to appropriately equipped central office switching systems, such as SSPs 60, 62, 64, 66, 68, and 70, and a plurality of packet switches, termed Signaling Transfer Points (STPs). To provide redundancy and thus a high degree of reliability, the STPs typically are implemented as mated pairs, as illustrated by the overlapping rectangles, 80, 82, and 84. The CCIS network of the telephone system operates in accord with an accepted signaling protocol standard, preferably Signaling System 7 (SS7). The SCPs 50, 52 are linked to STPs 80 and 84 respectively over A-Links (Access Links). SSPs 60, 62, 64, 66, 68, and 70 connect to the various STPs via A-Links as well. In general, A-Links connect signaling points/signaling end points to home (i.e., serving) STPs. A signaling point/signaling end point refers to a node in the CCSN that originates, receives, or transfers signaling messages from one singling link to another. Further, local STP 84 connects to the next level STPs 80 (i.e., regional STPs) through D-Links (Diagonal Links), while STPs 80, 82 on the same level use B-Links (Bridge Links) for connectivity. STPs of each noted pair connect to each other via C-links.

Figure 4A:
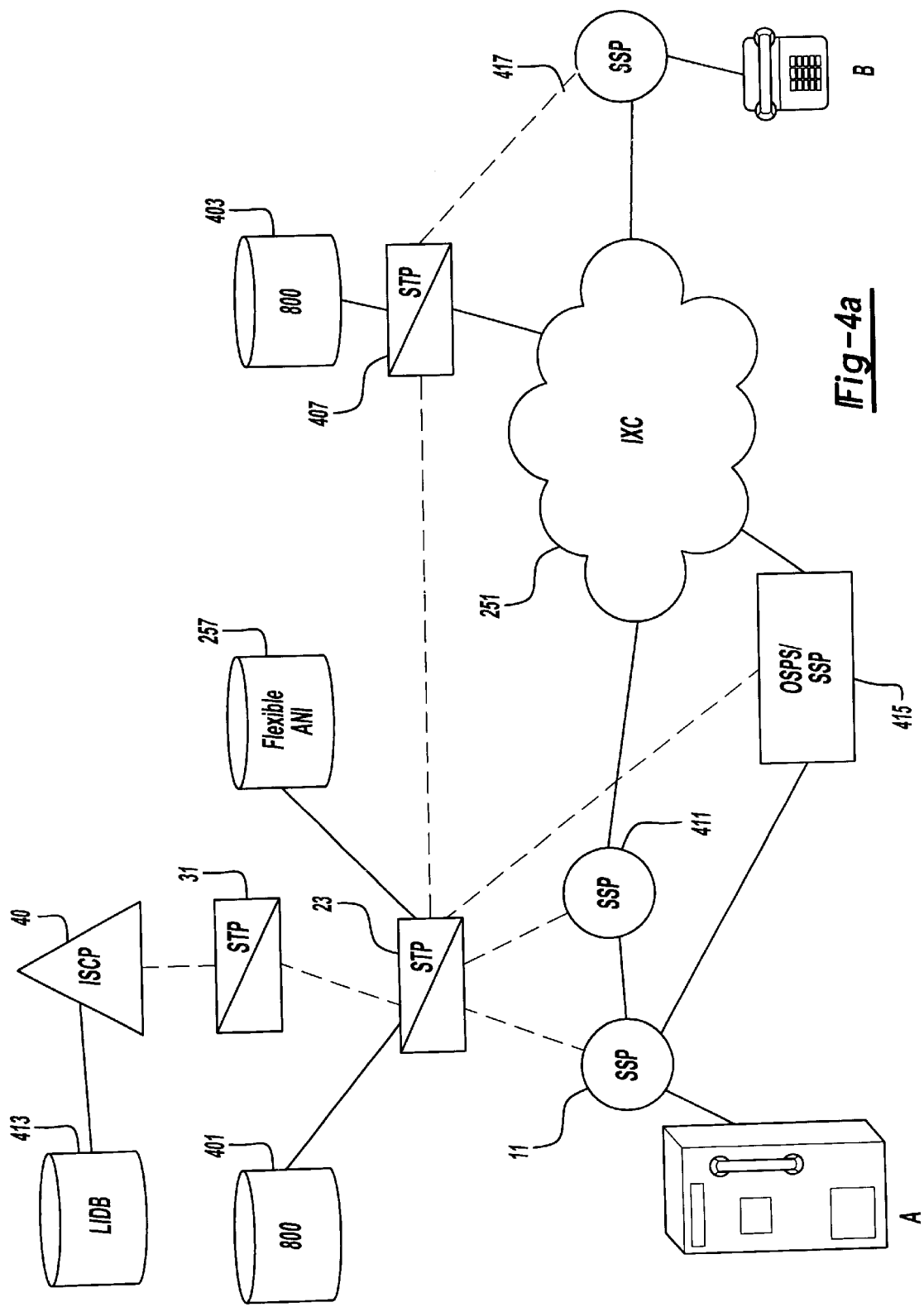
FIGS. 4a and 4b are block diagrams showing an AIN architecture in accord with the present invention.
Figure 4B:
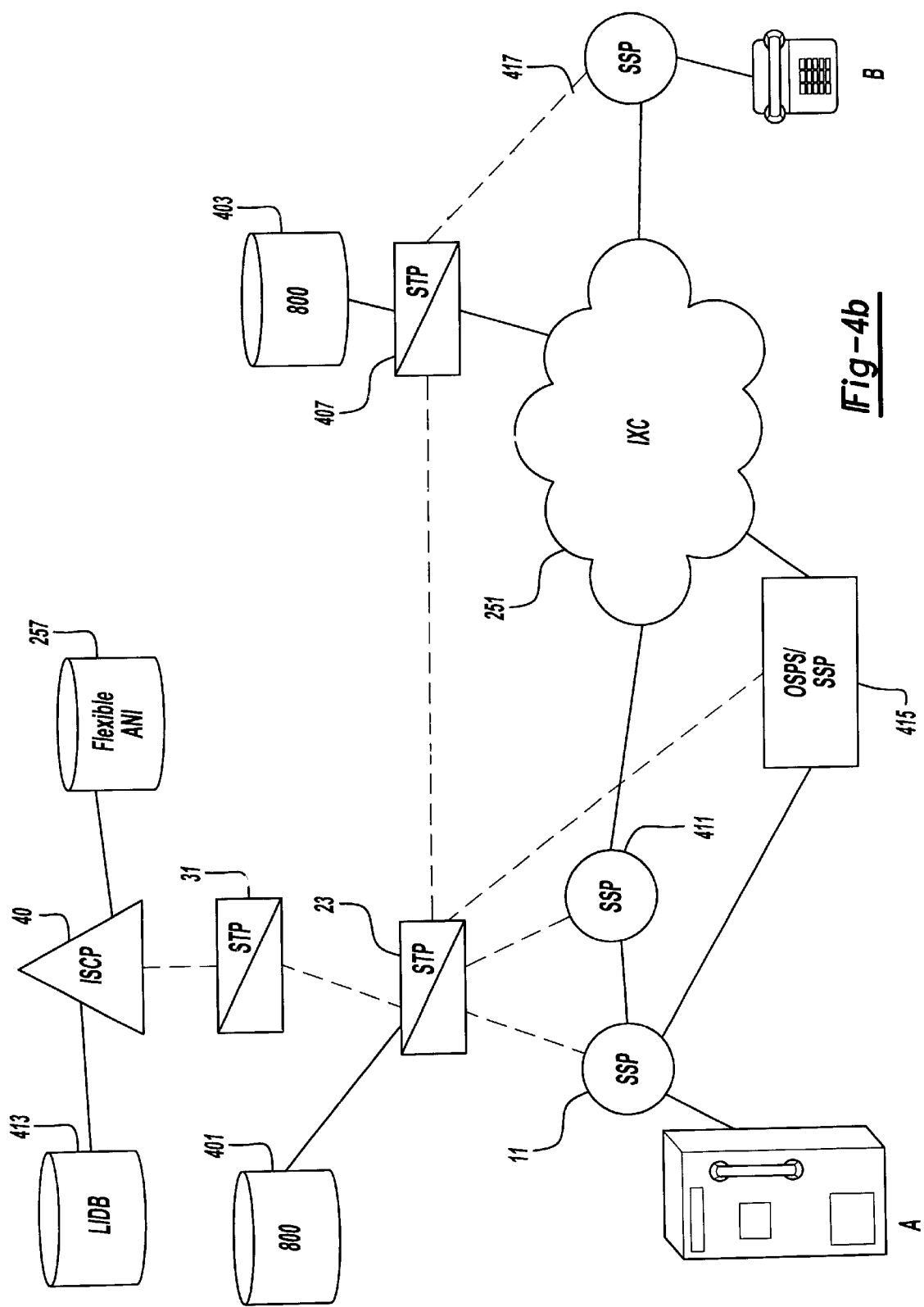

FIGS. 4a and 4b show the preferred embodiments in which the flexible ANI database 257 is deployed in an advanced intelligent network; the II digits are passed using out-of-band signaling via the CCSN. The exemplary network configuration of FIG. 4a utilizes SSP capable switches at central offices 11, 411, and 417, wherein the flexible ANI database 257 resides within STP 23. FIG. 4a provides a more detailed network architecture of FIG. 3a in accord with the present invention. As previously mentioned, switches without SSP functionality can also be used, however, these switches would simply route the call to a SSP capable switch when an AIN trigger is detected. Here, SSP 11 serves station A, which is a COCOT. The SSP 11 provides connectivity to STP 23, which is then linked to a regional STP 31. In response to a PIC or trigger associated with station A, SSP 11 initiates a query through the CCIS signaling network to an Integrated Service Control Point (ISCP) 40, which may alternatively be just a Service Control Point (SCP).

ISCP 40 connects to a Line Identification Database (LIDB) 413. The LIDB provides subscriber account related information, for special billing arrangements, calling card billing services or for subscriber name display purposes in an enhanced caller ID application. As used here, the LIDB 413 supplies line attribute information to OSPS/SSP 415, which in turn, generates the two II digits for calls involving operator services (which is described in more detail below). SSP 11 generates the II digits from its internal translation tables. A tandem SSP 411 links to the IXC 251, thus providing a route for interLATA calls from station A to, for instance, station B. One advantage with the flexible ANI approach of the present invention is that the new II digits are preserved, even if the tandem SSP 411 is along the call path. As a consequence, the serving SSP 11 need not be directly connected to the IXC 251; otherwise, the network architecture would be severely limited and extremely expensive because every SSP (that desires the capabilities attending the use of flexible II digits) would be required to provide a point of presence to the IXC 251.

In the alternative, the call initiated by station A can be handled by the Operator Services Position System (OSPS) 415, which has a direct link to the serving SSP 11 as well as the IXC 251. The OSPS 415 is basically a SSP 11 with the capability to handle long-distance calls from non-coin and coin-operated stations and to record call details for billing purposes. STP 23 permits SSP 11, SSP 411, and OSPS 415 to communicate with SCP 40 for the processing of calls. SSP 11 and OSPS 415 signal to SCP 40 to query the LIDB 413, which houses all valid billing numbers. Based upon the line information retrieved by SCP 40, the SSP 11 (or the OSPS, depending on the AIN trigger) passes along the appropriate two II digits.

In this embodiment, the two II digits may be translated via the flexible ANI database 257 at STP 23. For example, if station A initiates a toll-free call, the SCP 40 would instruct the STP to process the necessary II digit translation using the flexible ANI database 257. The serving SSP 11 continues to process the toll-free call by routing the call to the terminating SSP 417. The terminating SSP 417 then rings the target station B.

The STP 23 is connected to an 800 database 401; the database 401 may instruct a querying SSP to access another 800 database 403 by way of STP 407 or may itself translate the toll-free number into a true directory number. It should be noted that the term "800 database" also encompasses other prefixes (e.g., 888, etc.), which indicate that the call is toll-free. After the directory number is determined, the call setup can be completed. The call flow from COCOT A (FIG. 4a) to target station B is more fully explained in FIG. 5a.

FIG. 4b is essentially an identical AIN configuration of FIG. 4a, except that the flexible ANI database 257 is now housed with ISCP 40. FIG. 4b is consistent with the PSTN of FIG. 3b, but provides greater detail with respect to the toll-free capabilities of the network. If the coin-operated station A dials a toll-free number, SSP 11 transmits a query to ISCP 40 to retrieve information from the flexible ANI database 257 for the II digit translation. Placement of the flexible ANI functionality within the SCP advantageously minimizes delay because the SCP directly performs that processing.

Figure 5A:
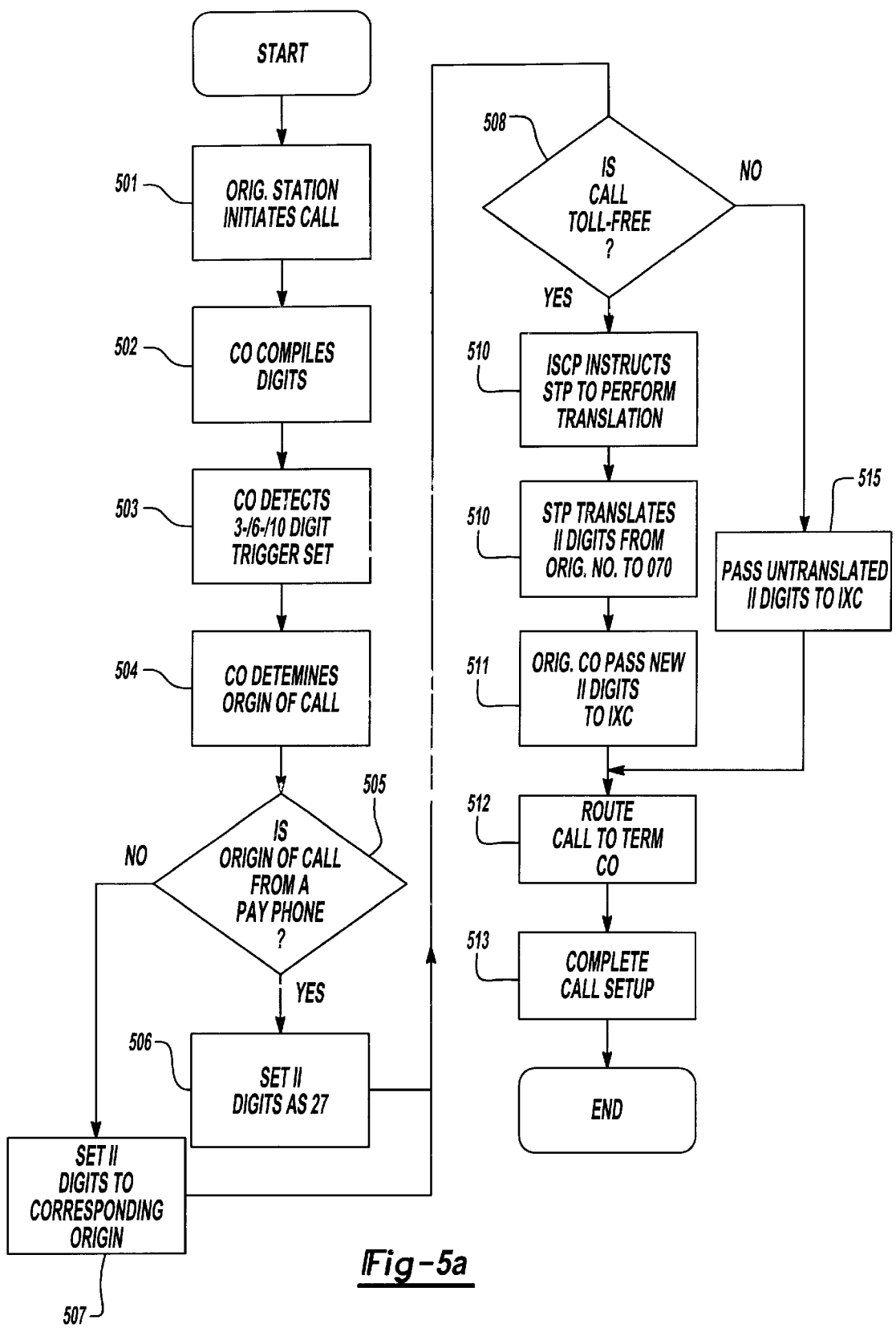
FIGS. 5a and 5b are flow diagrams of call establishments consistent with the AIN of FIGS. 4a and 4b, respectively.

FIG. 5a, as previously mentioned, shows the call flow associated with the network of FIG. 4a. Station A, a coin-operated phone, places a call to station B (step 501). The serving SSP 11 collects the dialed digits, illustrated in 502, and then examines whether an AIN trigger has occurred (via the 3-/6-/10 digit trigger set), as in step 503. Next, SSP 11 determines the origin of the call by querying the customer profile within the switch based on the terminal line of station A (504). In this example, the line attribute of station A would indicate that the call is from a coin-operated station. Once the origin is determined (per step 505), the II digits may be set accordingly by SSP 11. Because the call is from a COCOT, the II digits are set to "27", as shown in 506; "27" is the code that has been agreed to by industry consensus to signify a COCOT. If on the other hand, the call is a non-coin call, the II digits would be set to whatever category that corresponds to the origin (507). For example, if the call originated from a POTS line, the II digits would be "00".

In step 508, the SSP 11 determines whether the call is a toll-free call by examining the dialed digits. To process the toll-free call, SSP 11 queries, for example, a 800 database 401, which may be a national 800 database that points to other more localized 800 databases. The 800 database 401 may refer SSP 11 to obtain the translation to a true directory number of station B at 800 database 403. Alternatively, the 800 database 401 may provide the necessary translation itself.

After determining that the call is toll-free (508), ISCP instructs the STP 23 to perform the translation from the two II digits of "27" into three digits "070" (509, 510). The three digit "070" may follow a proprietary code definition scheme such that it conveys multiple line attributes. The LEC may itself define a series of codes for its own internal call processing. In this instance, "070" indicates that the call originated from a COCOT and that the call is toll-free. Thus, the serving SSP 11 (i.e., originating CO) replaces the II digits with the new II digits and passes this information to the other nodes of the PSTN to reach the IXC 251 (step 511). The call is then routed to the terminating CO, SSP 417. Once the called station (station B of FIG. 4*a*) acknowledges the call, the setup is complete (513). However, if the call is not toll-free (508), the untranslated (i.e., original) II digits are passed to the IXC 251, as in step 515. Thereafter, the call is simply routed to the terminating CO (560), which then completes the call setup (513).

Because the IXC 251 is now aware of the origin and type of call, it may elect to route the call to the terminating SSP 417 (shown in step 512) or block the call. It should be observed that IXC 251 must be provided with the proprietary code definitions so that it may properly interpret the new II digits. If the IXC 251 decides that it does not want to process the call, it responds with a release call message in which case the call can be rerouted, for example, to an automatic intercept system (AIS) or simply terminated. The AIS may then indicate to the calling party that the user can not place such a call. The indication may be through a voice message or a tone. If no AIS is employed, the serving SSP 11 may signal the calling station A in the conventional manner. With the blocking service, the IXC 251 is given greater control of how its networking resources are utilized.

If the IXC passes the call, the IXC network 251 signals the terminating SSP 417, which then completes the call setup (513) by ringing station B. The new II digits also permit the proper call accounting functions to be performed so that the fees associated with the call can be apportioned among the LEC, the COCOT owner, and the IXC 251. The billing functions are provided by various operation support systems (OSSs).

These OSS systems (not shown) include provisioning systems to establish, update and maintain the profiles and other control data in the central offices and the SCPs. The OSSs also include usage data processing systems for accumulating usage statistics and for processing usage data to create billing records. In the event that the call is not toll-free, the untranslated II digits are passed to the IXC 251 (step 515). Under this scenario, the IXC 251 routes the call to the terminating CO 417 (step 512), thus completing the call (513).

Figure 5B:
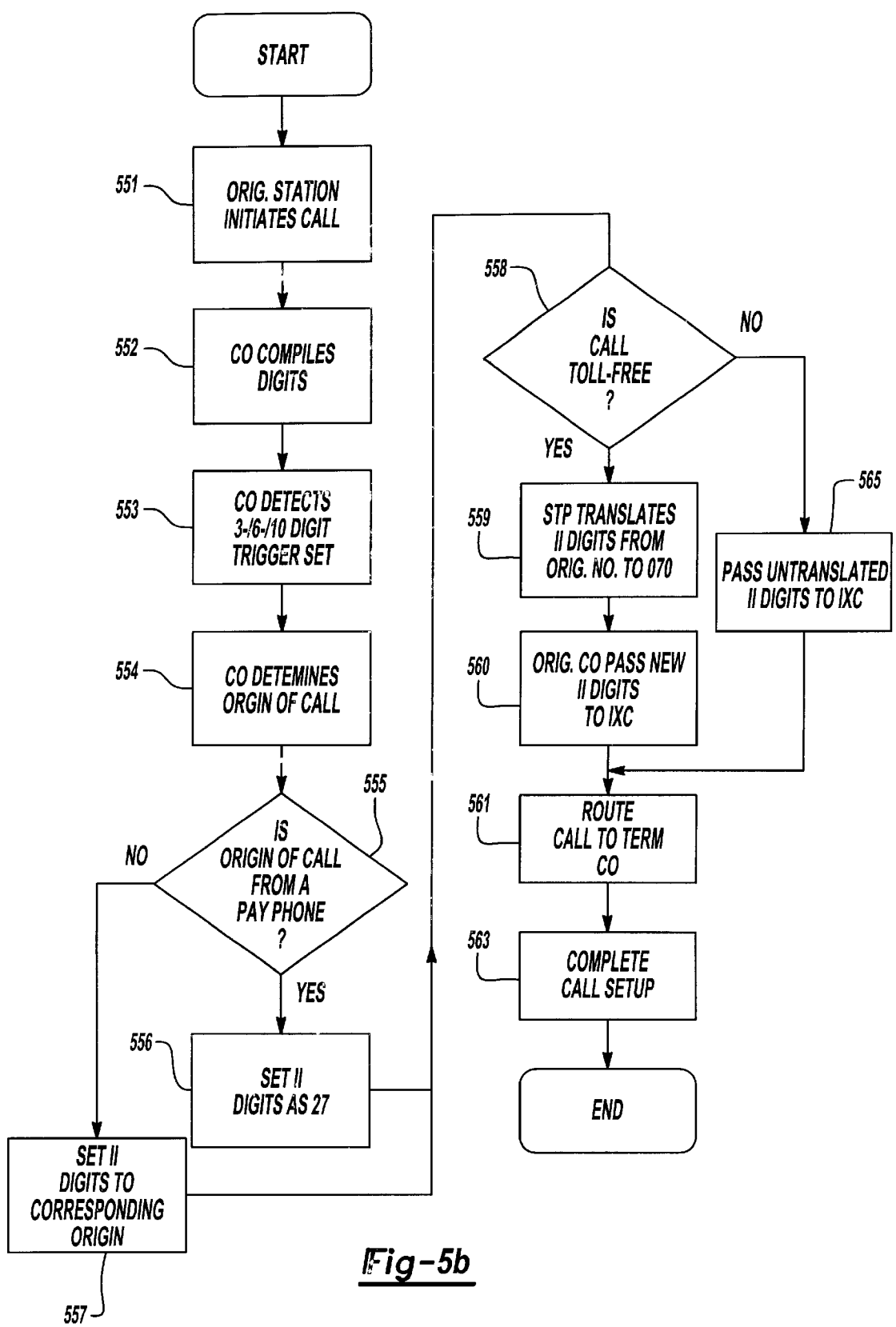

The above discussion places the flexible ANI database functionality within the STP 23; FIG. 5*b*, however, contemplates this functionality residing in ISCP 40. The steps 551–558 are identical to that of the call flow sequences 501–508 of FIG. 5*a*. The difference lies in step 559, in which the ISCP 40 performs the II digit translation instead of the STP 23. The remaining steps of 560, 561, 563, and 565 are similar to the steps of 510, 511, 513, and 515 of FIG. 5*a*.

According to the disclosed embodiments, a flexible ANI database is deployed in a PSTN to enhance network service offerings related to the II digits. The flexible ANI database provides the capability to manipulate the II digits to convey multiple line attributes associated with a single terminal line. This capability enables call blocking by network providers. The flexible ANI database is particularly germane to toll-free service initiated by coin-operated stations, whereby the II digits translated to a new set of II digits to preserve information regarding the origin and type of call. Such information is critical to proper accounting among the owner of the coin-operated station, the local exchange carrier, and the interexchange carrier.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method for providing telecommunication services over a telephone network, the method comprising:
   receiving a request to establish a telephone call link from a station via a terminal line;
   retrieving line attribute information associated with the terminal line;
   generating a first identification message based on the line attribute information;
   translating the first identification message into a second identification message; and
   establishing the call link based on the second identification message.

2. The method as in claim 1, further comprising:
   collecting dialed digits originating from the station, wherein the second identification message is based in part on the collected dialed digits; and
   relaying the second identification message through the telephone network.

3. The method as in claim 2, wherein the second identification message is relayed using in-band signaling.

4. The method as in claim 2, wherein the second identification message is relayed using out-of-band signaling.

5. The method as in claim 2, wherein the relaying step comprises traversing a tandem central office switching system.

6. The method as in claim 1, wherein the station is coin-operated.

7. The method as in claim 1, wherein the telephone call is toll-free and is routed via an interexchange carrier network.

8. The method as in claim 1, wherein the translating step is executed within an integrated service control point (ISCP).

9. The method as in claim 1, wherein the translating step is executed within a signaling transfer point (STP).

10. A method for providing telecommunication services over a telephone network, the method comprising:
    receiving a request to establish a telephone call from a station over a terminal line;
    retrieving line attribute information associated with the terminal line from a customer profile;
    generating a first set of automatic number identification information digits based on the line attribute information;
    translating the first set of automatic number identification information digits into a second set of automatic number identification information digits that indicate multiple line attributes related to the terminal line;
    relaying the second set of automatic number identification information digits to a terminating end office; and establishing the call connection based upon the second set of automatic number identification digits.

11. The method as in claim 10, further comprising collecting dialed digits originating from the station, wherein the second set of automatic number identification information digits are based in part on the collected dialed digits.

12. The method as in claim 10, wherein the second set of automatic number identification information digits are relayed using in-band signaling.

13. The method as in claim 10, wherein the second set of automatic number identification information digits is relayed using out-of-band signaling.

14. The method as in claim 10, wherein the relaying step comprises traversing a tandem central office switching system.

15. The method as in claim 10, wherein the station is coin-operated.

16. The method as in claim 10, wherein the telephone call is toll-free and is routed via an interexchange carrier.

17. The method as in claim 10, wherein the translating step is executed within an integrated service control point (ISCP).

18. The method as in claim 10, wherein the translating step is executed within a signaling transfer point (STP).

19. A communication system for providing telecommunication services and associated accounting functions comprising:

a station for establishing a telephone call over a terminal line;

a plurality of separately located central office switching systems interconnected via trunk circuits for selectively providing switched telephone call communications to the terminal line;

a customer profile coupled to one of the plurality of central office switching systems comprising line attribute information associated with the terminal line, wherein the one central office switching system is configured to generate a first line identification number based upon the line attribute information; and a line identification database for storing a second line identification number, the line identification database being accessible by any one of the plurality of central office switching systems, wherein the one central office switching system is configured to translate the first line identification number into the second line identification number via queries to the line identification database, the second line identification number being relayed to another central office switching system, the second line identification number being used to support the accounting functions related to the telephone call.

20. The communication system as in claim 19, further comprising:

a signaling transfer point (STP) via signaling links to at least one of the plurality of separately located central office switching systems;

an integrated service control point (ISCP) coupled to the STP for assisting the central office switching systems with establishment of the telephone call; and a signaling communication link for providing two-way communications of data messages between the STP and the ISCP.

21. The communication system as in claim 19, wherein:

the one central office switching system comprises an originating central office switching system collecting dialed digits from the station, wherein the second identification number is based in part on the collected dialed digits; and the originating central office switching system relays the second identification number via the telephone network to a terminating central office switching system.

22. The communication system as in claim 19, wherein the second identification number is relayed by the telephone network using in-band signaling.

23. The communication system as in claim 19, wherein the second identification number is relayed by the telephone network using out-of-band signaling.

24. The communication system as in claim 19, wherein the second identification number is relayed through a tandem central office switching system.

25. The communication system as in claim 19, wherein the station is a coin-operated.

26. The communication system as in claim 20, wherein the line identification database is coupled to the STP.

27. The communication system as in claim 20, wherein the line identification database is coupled to the ISCP.

* * * * *